(12) United States Patent
Reubeuze et al.

(10) Patent No.: US 8,414,077 B2
(45) Date of Patent: Apr. 9, 2013

(54) MECHANISM FOR ADJUSTING THE TILT OF AN AUTOMOTIVE VEHICLE SEAT, AUTOMOTIVE VEHICLE SEAT, AND MANUFACTURING METHOD

(75) Inventors: Yann Reubeuze, Landigou (FR); François Baloche, La Carneille (FR)

(73) Assignee: Faurecia Sièges d'Automobile, Nanterre (FR)

( * ) Notice: Subject to any disclaimer, the term of this patent is extended or adjusted under 35 U.S.C. 154(b) by 300 days.

(21) Appl. No.: 12/870,163

(22) Filed: Aug. 27, 2010

(65) Prior Publication Data

US 2011/0057494 A1 Mar. 10, 2011

(30) Foreign Application Priority Data

Sep. 9, 2009 (FR) ...................................... 09 56140

(51) Int. Cl.
*B60N 2/235* (2006.01)
(52) U.S. Cl.
USPC ...................... 297/367 P; 297/366; 297/367 R
(58) Field of Classification Search .................. 297/366, 297/367 R, 367 P
See application file for complete search history.

(56) References Cited

U.S. PATENT DOCUMENTS

| | | | |
|---|---|---|---|
| 4,505,515 A | 3/1985 | Wilking et al. | |
| 5,451,096 A * | 9/1995 | Droulon | 297/463.1 |
| 6,112,370 A * | 9/2000 | Blanchard et al. | 16/325 |
| 7,100,986 B2 * | 9/2006 | Uramichi et al. | 297/366 |
| 7,140,686 B2 | 11/2006 | Rohee | |
| 7,354,109 B2 * | 4/2008 | Oki | 297/367 R |
| 7,380,882 B2 * | 6/2008 | Oki | 297/367 R |
| 7,416,255 B2 * | 8/2008 | Yamada et al. | 297/367 R |
| 2007/0040436 A1 * | 2/2007 | Oki | 297/367 |
| 2010/0033004 A1 | 2/2010 | Reubeuze | |

FOREIGN PATENT DOCUMENTS

| | | |
|---|---|---|
| EP | 2 153 751 A1 | 11/2008 |
| FR | 2 578 601 | 3/1985 |
| FR | 2 872 105 | 6/2004 |
| FR | 2 878 196 | 11/2004 |
| FR | 2 890 913 | 9/2005 |
| FR | 2 927 027 | 2/2008 |
| WO | WO-2008/139851 A1 | 11/2008 |

OTHER PUBLICATIONS

French Preliminary Search Report from priority application No. FR 09 56140; Report dated Apr. 23, 2010.
Written Opinion from priority application No. FR. 09 56140.
Japanese Office Action issued in related Japanese Application No. JP 2010-200799; action dated Sep. 12, 2012.

* cited by examiner

*Primary Examiner* — David Dunn
*Assistant Examiner* — Philip Gabler
(74) *Attorney, Agent, or Firm* — Miller, Matthias & Hull LLP

(57) ABSTRACT

The mechanism for adjusting the tilt of an automobile vehicle seat comprising a first flange entirely obtained from a shaped metallic element, a second flange comprising a central part and a peripheral part is disclosed. The internal face of the first flange is opposite the external face of the second flange to guide a rotational movement of the flanges. The retaining face of the first flange is opposite the rear face of the second flange, to retain the second flange in the first flange along the pivot axis.

9 Claims, 3 Drawing Sheets

MECHANISM FOR ADJUSTING THE TILT OF AN AUTOMOTIVE VEHICLE SEAT, AUTOMOTIVE VEHICLE SEAT, AND MANUFACTURING METHOD

CROSS-REFERENCE TO RELATED APPLICATION

This application claims priority under the Paris Convention to French Patent Application No. FR 09 56140, filed on Sep. 9, 2009.

FIELD OF THE DISCLOSURE

This invention relates to the mechanisms for adjusting the tilt of an automobile vehicle seat, the vehicle seats equipped with such mechanisms, and the manufacturing methods of such mechanisms.

BACKGROUND OF THE DISCLOSURE

More particularly, the invention concerns a mechanism for adjusting the tilt of an automobile vehicle seat comprising:
- a first flange entirely obtained from a shaped metallic element, comprising a front face, an internal face that is at least partially cylindrical around a pivot axis, and a retaining face,
- a second flange comprising a central part and a peripheral part featuring a front face that is opposite the front face of the first flange, an external face at least partially cylindrical around the pivot axis, and a rear face.

The document FR 2 578 601 describes an example of such a tilting adjustment mechanism. In this document, a ring is used, attached to one of the flanges, and crimped onto the other, to hold the two flanges together to prevent a relative movement thereof along the pivot direction.

However, it is still sought to improve such systems, and in particular to simplify them whilst maintaining their operational functions intact.

SUMMARY OF THE DISCLOSURE

Consequently, a mechanism of the type in question is characterised in that the internal face of the first flange is opposite the external face of the second flange to guide a relative rotational movement of the first and second flanges around the pivot axis,
and in that the retaining face is opposite the rear face of the second flange, to retain the second flange in the first flange along the pivot axis.

Thanks to these measures, the additional ring is no longer required, which reduces the supply and logistics problems for the parts, and reduces the number of assembly operations.

In certain embodiments, the following measures may also possibly be used:
- the mechanism further comprises a grain borne by the first flange, wherein said grain comprises a first locking surface,
- the second flange comprises an internal face that is at least partially cylindrical around the pivot axis, and which is opposite the external face of the second flange, wherein said internal face of the second flange comprises a second locking surface,
- said grain is fitted so that it is mobile on the first flange between
  - an active position in which the first and second locking surfaces engage so as to prevent any relative rotation of the first and second flanges around the pivot axis, and
  - an inactive position in which the first and second locking surfaces do not engage, to allow said rotation;
- the first flange is fitted with a plurality of retaining portions, distributed around the pivot axis, and each comprising a said retaining face;
- retaining face and internal face of the first flange are angularly offset with respect to one another around the pivot axis;
- the mechanism further comprises a radial opening between the retaining face and the internal face of the first flange;
- the first flange comprises:
  - a central plate featuring the front face, and
  - a peripheral crown around the pivot axis, extending from the central plate, wherein said peripheral crown comprises an internal face forming said internal face of the first flange, and at least one retaining element, which protrudes with respect to said internal face, wherein said protrusion bears said retaining face.

According to another aspect, the invention concerns an automobile vehicle seat comprising a first element, a second element, and such a mechanism, wherein the first flange is fixed to the first element and the second flange is fixed to the second element.

According to another aspect, the invention concerns a manufacturing method for a mechanism for adjusting the tilt of an automobile vehicle seat in which:
(a) a first flange is entirely obtained from a shaped metallic element to comprise a front face, an internal face that is at least partially cylindrical around a pivot axis, and a retaining face,
(b) a second flange is provided comprising a central part and a peripheral part featuring a front face designed to be opposite the front face of the first flange, an external face that is at least partially cylindrical around the pivot axis, and a rear face,
(c) the first and second flanges are placed such that the front face of the first flange is opposite the front face of the second flange and the internal face of the first flange is opposite the external face of the second flange to guide a relative rotational movement of the first and second flanges around the pivot axis,
(d) the first flange is deformed such that the retaining face is opposite the rear face of the second flange, to retain the second flange in the first flange along the pivot axis.

In certain embodiments, it may be necessary to use one and/or the other of the following measures:
- in step (d), a retaining portion of the first flange is deformed radially toward the pivot axis, and longitudinally toward the front face of the first flange, to press a retaining face of the retaining portion onto the rear face of the second flange;
- in step (a), a first flange is obtained comprising a radial opening between the front face and a retaining portion featuring the retaining face.

Other features and advantages of the invention will become clearer in the following description of one of its embodiments, provided by way of non-restrictive example, in reference to the attached drawings.

BRIEF DESCRIPTION OF THE DRAWINGS

In the drawings.

In the different figures, the same references are used to designate identical or similar elements.

DETAILED DESCRIPTION OF THE DISCLOSURE

Figure 1:
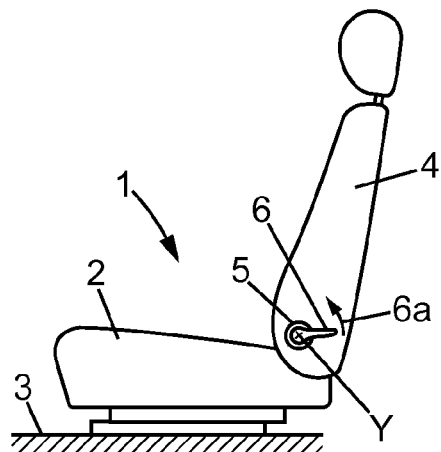
FIG. 1 is a diagrammatical side view of an automobile vehicle seat.
Figure 2:
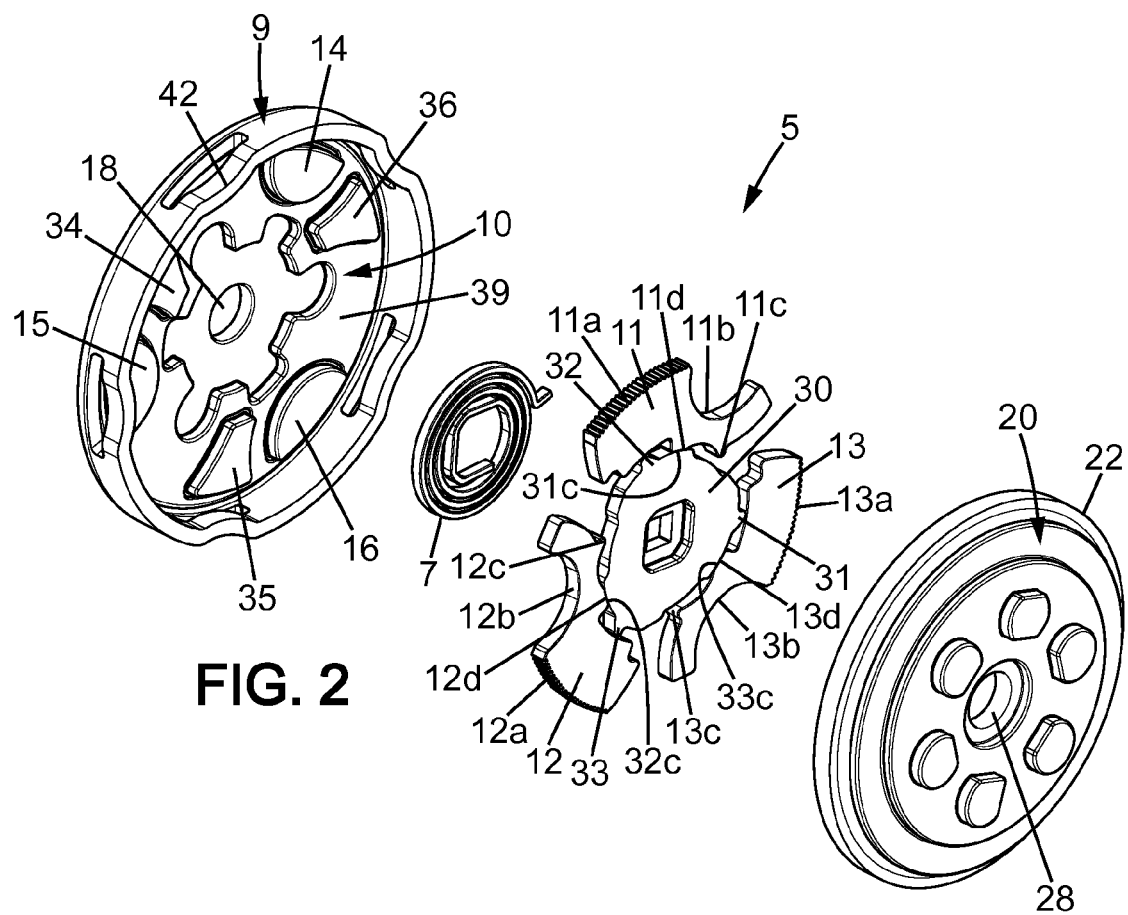
FIG. 2 is an exploded perspective view of an adjustment mechanism.

As shown diagrammatically in FIG. 1, the invention concerns a seat 1 of a vehicle which features a seat chair 2 mounted on a vehicle floor 3 and a seat back 4 mounted so that it pivots on the seat chair 2 by at least one articulated mechanism 5, around a main articulation axis Y which extends transversally and substantially horizontally.

The articulation mechanism 5 has for example a single level and may be commanded for example by means of a handle 6 which may be actuated in the direction 6a to release the pivoting of the seat back 4 around the main axis of rotation Y.

As illustrated in FIGS. 2 to 6b, the articulation mechanism 5 essentially comprises a first flange 10, a second flange 20, three locking elements 11, 12, 13, or "grains", a movement transfer element 30, or "cam", and a command rod (not shown), which passes through the central opening of the cam and each of the flanges.

The general form of the first flange 10 is a rigid disc, formed by stamping, which is fixed for example to the chair 2 of the seat. It features a bore extending along the main axis of rotation Y and forms a passage 18 for the command rod, and is connected to the handle 6.

It further comprises three circular shaped guiding elements 14, 15, 16 which are identical and are distributed on the periphery around the main axis of rotation, for example at 120°.

The first flange 10 further features three additional retaining elements 34, 35, 36 which are each respectively positioned circumferentially between two grains 11, 12, 13. These three elements are for example identical, only the element 34 will be described below: it features a first surface opposite a complementary surface of the grain 11 and a second surface opposite a complementary surface of the grain 12 (all cylindrical with a generating line parallel to the Y axis).

The first flange 10 thus has a central plate 50 that is substantially flat normal to the Y axis, featuring a front face 39 and a rear face 51 opposite. The guiding elements 14, 15, 16 and the retaining elements 34, 35, 36 are formed by stamping, so that they protrude with respect to the plane of the front face 39. Similarly, holding patterns may be formed, either protruding or depressed, in the rear face 51, for example to help attach the flange on an element frame of an automobile vehicle seat.

The first flange 10 also features a peripheral crown 9 featuring a cylindrical internal face 52 revolving around the Y axis, orientated towards this axis, and an opposite cylindrical external face 53 revolving around the Y axis, orientated opposite to this axis, and positioned further away from the axis than the internal face 52.

The peripheral crown 9 also features a front face 54 parallel to the front face 39 of the central plate 50, and which joins the inside 52 and external 53 faces.

Figure 3:
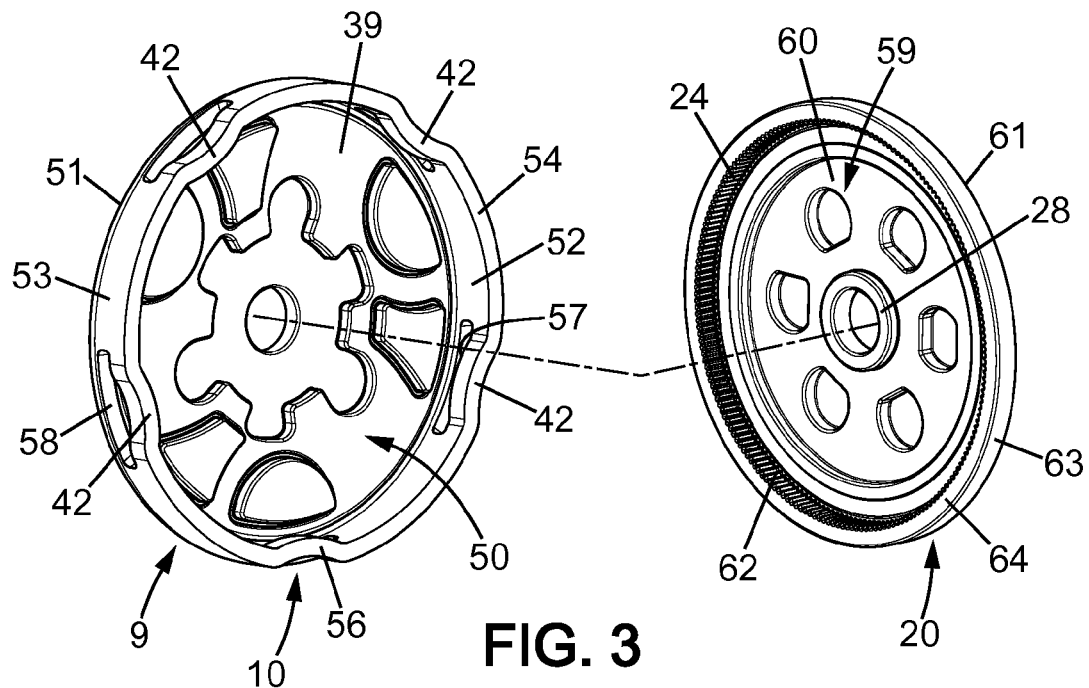
FIG. 3 is a partial view of two flanges of an adjustment mechanism, according to two different perspectives.
Figure 4:
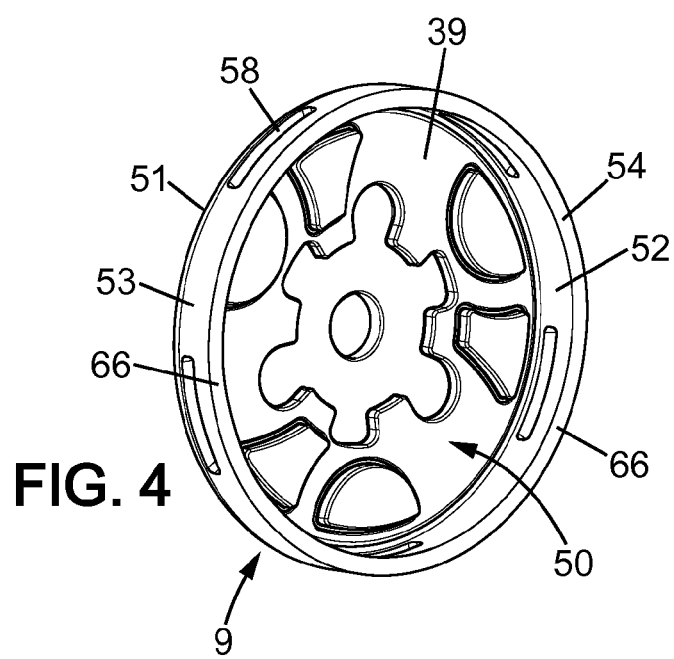
FIG. 4 is a view which corresponds to FIG. 3 for one of the two flanges at an intermediate step of the manufacturing method.
Figure 5A:
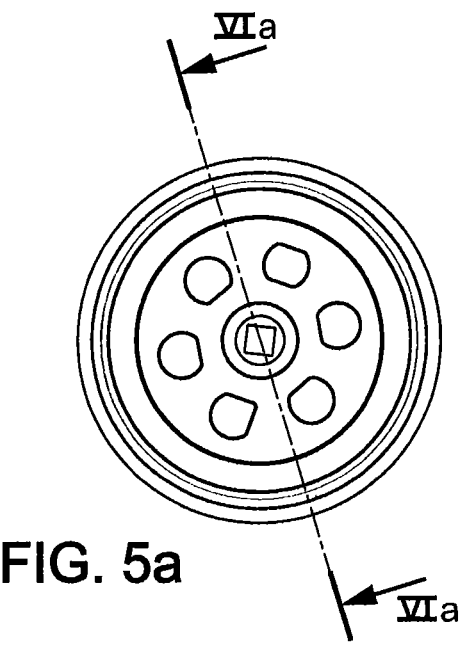
FIGS. 5a and 5b are two identical plane views at two successive steps of an assembly method.
Figure 5B:
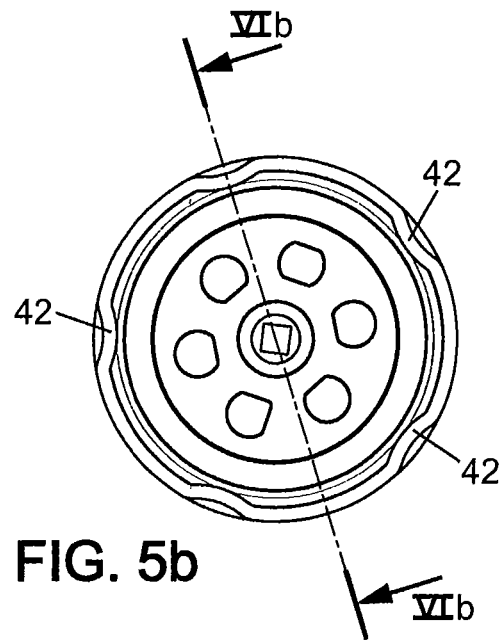

As may be seen in FIG. 3, the peripheral crown 9 is equipped, in a distal region (i.e. distant from the central plate) with longitudinal retaining elements 42, which protrude radially inwards with respect to the cylindrical revolution internal surface 52. These retaining elements 42 may be for example distributed circumferentially around the Y axis, for example uniformly. There is a plurality of distinct elements. In the example provided, there are five of them. They each have a front face 56 that continues from the front face 54, and a rear face (or retention face) 57, opposite to the front face, substantially normal to the Y direction, which is most visible in FIG. 6b.

In the example presented, a through opening 58 is provided in a proximal region of the crown (i.e. close to the central plate). It extends radially in the crown 9, and is positioned longitudinally between the retaining element 42 and the central plate 50. Consequently, in certain angular sectors of the flange, the crown features an internal face that is purely cylindrical in the proximal and distal regions. In other angular sectors, they feature an opening in the proximal region then a retaining element in the distal region, positioned one after the other in the longitudinal direction when moving from the central plate to the front face.

However, such openings are not essential to the implementation of the invention.

The second flange 20 has the general form of a rigid disc, formed by stamping, which is fixed in this case to the seat back 4. It comprises a central plate 59 extending substantially in a plane that is normal to the Y axis, and which has a front face 60 and a rear face 61 opposite. The latter may feature attachment patterns, for example formed by stamping, to attach it to the seat back 4.

The second flange also features a peripheral crown 22 comprising an internal face 62 that is globally circumferential around the Y axis, and has a toothed segment equipped with teeth 24. An external face 63 is opposite the internal face, and has a smooth cylindrical geometry revolving around the Y axis, and with a radius that is substantially equal, slightly less than that of the internal face 52 of the crown 9 of the first flange. A front face 64 joins the internal 62 and external 63 faces, and extends for example normally to the Y axis.

The second flange also features a cylindrical bore with a circular section extending along the main axis of rotation Y and forming a passage 28 for the command rod.

The retaining elements 42 of the peripheral crown 9 of the first flange 10, which protrude radially towards the centre, retain the second flange 20 in the first flange 10, preventing relative translation of these two flanges along the Y axis whilst permitting their relative rotation around this axis.

In the assembled position, the front face 64 of the crown 22 of the second flange 20 is opposite the front face 50 of the first flange. The peripheral part of the rear face 61 of the second flange is opposite the retaining face 57 of the first flange 10. They are consequently situated directly opposite one another, with no intermediate parts or elements between them. The external face 63 of the crown 22 of the second flange 20 is opposite the internal face 52 and, where applicable, the openings 58 of the crown 9 of the first flange 10.

The actuation transfer element 30, or "cam", has three hooks 31, 32, 33 and three actuation surfaces designed to engage with each of the respective locking elements 11, 12, 13. Each hook 31, 32, 33, is provided to release the grains.

The cam 30 is stationary to the rod and mobile in rotation around the main axis of rotation Y between a locked position and an unlocked position.

The cam 30 engages with the locking elements 11, 12, 13 in a plane extending perpendicularly to the main axis of rotation Y, such that the cam 30 does not extend in the direction of the main axis of rotation Y between the locking element 11, 12, 13 and the first flange 10, nor between the locking elements 11, 12, 13 and the second flange 20, but engages radially to the main axis of rotation Y with the locking elements 11, 12, 13.

A spring 7 tends to bring the cam 30 back to the locked position.

The locking elements 11, 12, 13 are positioned regularly (at 120°) in the first flange 10. They each comprise a toothed segment 11a, 12a, 13a, a guide portion 11b, 12b, 13b, a release pin 11c, 12c, 13c, and an actuation portion 11d, 12d, 13d.

Each guide portion features a guide surface that is complementary to an external face of the respective guide element 14, 15, 16.

In the active position, the cam presses against the actuation surface 11d, 12d, 13d of each of the locking elements 11, 12, 13, via the thrust surfaces, in order to maintain the locking elements in the active position.

In the active position of the locking elements, the toothed segments 11a, 12a, 13a engage with the teeth 24 of the toothed crown 22, in order to prevent the rotation between the first flange 10 and the second flange 20 around the main axis of rotation Y.

The engagement between the guide portions 11b, 12b, 13b and the guiding elements 14, 15, 16 enables a movement of the locking elements 11, 12, 13 in a plane that is normal to the Y axis between an active position and an inactive position. The faces of the locking elements 11, 12, 13 which are normal to the Y direction are in contact and slide on parallel front faces of the first and second flanges (Front face 39 of the first flange 10 and front face 60 of the second flange 12 as may be seen in FIG. 3). In the inactive position of the locking elements, the toothed segments 11a, 12a, 13a are distant from the teeth 24 of the crown 22, which enables free rotation between the first flange 10 and the second flange 20 around the main axis of rotation Y.

When the cam pivots from its locked position to its unlocked position from the action of the command rod (from the action of a user wishing to unlock the mechanism to adjust the relative orientation of the two flanges), the actuation surfaces disengage from the respective actuation surfaces 11d, 12d, 13d of the grains. Each of the retaining surfaces of the hooks 31, 32, 33 engage with the pin 11c, 12c, 13c of a respective grain 11, 12, 13 to bring said respective grain to the inactive position progressively as the pin is inserted 11c, 12c, 13c inside the hook.

When the user releases the handle, thus releasing the command rod 8, the spring 7 moves the cam 30 towards its active position. The hooks 31, 32, 33 of the cam disengage again from the pins 11c, 12c, 13c of the respective grains, then the actuation surface of the cam solicits the respective grains from their inactive position to their active position previously described. During this movement, the grains are guided by the engagement of the guide surfaces, until they reach the locked position previously described.

Even though this embodiment has been described in the context of a discontinuous adjustment mechanism with rotary grains, other embodiments may be envisaged by a person skilled in the art, provided that the two flanges are retained with one another in the Y direction, and are free to turn around this Y direction. For example, discontinuous mechanisms with sliding grains, or even continuous mechanisms with epicycloidal trains.

One example of an embodiment of a manufacturing method will now be provided in references to FIGS. 4 to 6b. A second flange, as described above, is obtained for example by stamping. As may be seen in FIG. 4, a first flange 10 is provided, substantially as described above, except that the parties 66 designed to form the retaining elements 42 do not protrude radially towards the centre with respect to the internal face 52 of the crown 9. For example, the crown 9 is provided as a perfectly hollowed cylinder, featuring the openings 58 mentioned previously. Such a creation may be made by stamping sheet metal, then making the openings 58. If required, the openings may be made before stamping, in the suitable positions on the original metal sheet.

Next, the two flanges are placed opposite one another, the front face 62 of the crown of the second flange 20 is opposite the front face 39 of the central plate of the first flange, and the external face 63 of the crown 22 of the second flange 20 is opposite the internal face 52. The insertion of the second flange in the first one is possible due to the fact that the retaining elements at this stage do not protrude. Beforehand, care has been taken to place all of the active elements of the system (cam, grains, spring, and others where applicable) between the flanges.

Figure 6A:
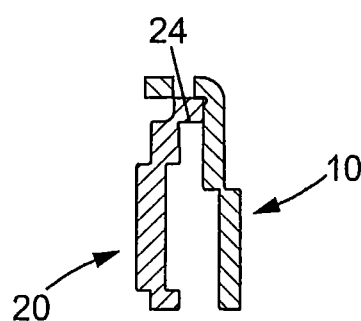
FIGS. 6a and 6b are two cross sectional views according to the VI-VI line respectively in FIG. 5a and FIG. 5b.
Figure 6A:
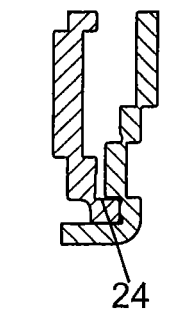
Figure 6B:
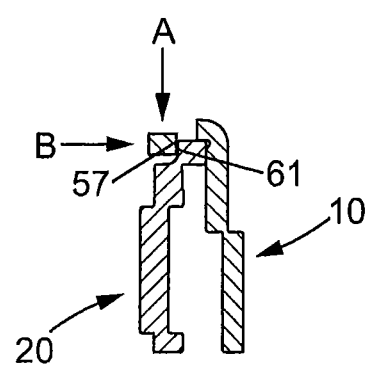
Figure 6B:
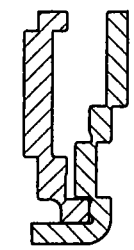

Next, as shown by the arrow A in FIG. 6b, the retaining elements are deformed, to move them radially inwards, in the direction of the Y axis, so that their rear retaining face 57 is opposite the rear face 61 of the second flange. This deformation is facilitated by the presence of the opening 58.

Where applicable, a deformation is made as shown by the arrow B in FIG. 6b, longitudinally along the Y axis in the direction of the front face 39 of the first flange to clamp the second flange with the retaining element, and reduce the longitudinal clearance.

The invention claimed is:

1. Mechanism for adjusting the tilt of an automobile vehicle seat, wherein the mechanism comprises:
    a first flange entirely obtained from a shaped metallic element, and comprising a front face, an internal face that is at least partially cylindrical around a pivot axis, a retaining face defined by at least one longitudinal retaining element, and a radial opening between the retaining face and the internal face,
    a second flange comprising a central part and a peripheral part featuring a front face that is opposite the front face of the first flange, an external face that is at least partially cylindrical around the pivot axis, and a rear face,
    wherein the internal face of the first flange is opposite the external face of the second flange to guide a relative rotational movement of the first and second flanges around the pivot axis,
    wherein the retaining face is opposite the rear face of the second flange, to retain the second flange in the first flange along the pivot axis.

2. Mechanism according to claim 1, further comprising a locking element borne by the first flange, wherein said locking element comprises a first locking surface,
    wherein the second flange features an internal face that is at least partially cylindrical around the pivot axis, and opposite the external face of the second flange, wherein said internal face of the second flange comprises a second locking surface,
    wherein said locking element is mounted so that it is mobile on the first flange between an active position wherein the first and second locking surfaces engage to prevent a relative rotation of the first and second flanges around the pivot axis, and an inactive position wherein the first and second locking surfaces do not engage, to allow said rotation.

3. Mechanism according to claim 1, wherein the first flange is equipped with a plurality of retaining portions, distributed around the pivot axis, and each featuring a part of said retaining face.

4. Mechanism according to claim 1, wherein the retaining face and internal face of the first flange are angularly offset with respect to one another around the pivot axis.

5. Mechanism according to claim 1 wherein the first flange features:

a central plate featuring the front face, and a crown that is peripheral around the pivot axis, extending from the central plate, wherein said internal face of the first flange is located as an internal face of the peripheral crown, and said at least one longitudinal retaining element forms a protrusion with respect to said internal face, wherein said retaining face is provided on said protrusion.

6. Automobile vehicle seat comprising a first element, a second element, and a mechanism according to claim 1, wherein the first flange is fixed to the first element, and the second flange is fixed to the second element.

7. Manufacturing method of a mechanism for adjusting the tilt of an automobile vehicle seat wherein:

a) a first flange is entirely obtained from a metallic element shaped so as to comprise a front face, an internal face that is at least partially cylindrical around a pivot axis, a retaining face defined by at least one longitudinal retaining element, and a radial opening between the retaining face and the internal face, b) a second flange is provided, comprising a central part and a peripheral part featuring a front face designed to be opposite the front face of the first flange, an external face that is at least partially cylindrical around the pivot axis, and a rear face, c) the first and second flanges are placed such that the front face of the first flange is opposite the front face of the second flange and the internal face of the first flange is opposite the external face of the second flange to guide a relative rotational movement of the first and second flanges around the pivot axis, d) the first flange is deformed such that the retaining face is opposite the rear face of the second flange, to retain the second flange in the first flange along the pivot axis.

8. Manufacturing method according to claim 7, wherein, in step d), a retaining portion of the first flange is deformed radially toward the pivot axis, and longitudinally toward the front face of the first flange, to press a retaining face of the retaining portion onto the rear face of the second flange.

9. Manufacturing method according to claim 7 wherein, in step a), a first flange is obtained which comprises a radial opening between the front face and a retaining portion featuring the retaining face.

\* \* \* \* \*